Patented Jan. 19, 1954

2,666,689

UNITED STATES PATENT OFFICE 2,666,689

PROCESS FOR THE PRODUCTION OF HYDROCYANIC ACID

Rudolph L. Heider, Texas City, Tex., assignor to Monsanto Chemical Company, St. Louis, Mo., a corporation of Delaware No Drawing. Application August 21, 1950, Serial No. 180,711

3 Claims. (Cl. 23—151)

The present invention is concerned with the production of hydrocyanic acid.

When hydrocyanic acid or hydrogen cyanide is formed by the reaction of a gaseous mixture containing ammonia, hydrocarbons such as methane, ethane and propane, in the presence of oxygen at elevated temperatures, it has been found that such reaction is accelerated by the presence of platinum as a catalyst. It has been customary in carrying out such a process to utilize the platinum in the form of a screen or gauze through which the gases are passed at a high velocity. The exothermic nature of the hydrocyanic acid forming reaction maintains the catalyst at the necessary reaction temperature. The products of the reaction are ordinarily quenched or cooled rapidly in order to obtain a substantial yield of the desired hydrocyanic acid.

It has been found, however, that platinum, as well as alloys thereof, such as platinum and iridium, utilized as catalysts in the present reaction, as described in U. S. Patent No. 2,105,831 of January 18, 1938, result in disintegration of the catalyst under the severe temperature conditions which are necessary. Although platinum is ordinarily considered to be exceedingly stable and the most corrosion-resistant of all metals, it has been found that at the high temperatures (950–1250° C.), utilized in the hydrocyanic acid reaction, the platinum is subject to recrystallization as well as volatilization resulting in loss of weight and activity of the catalyst as well as disintegration thereof. In conducting the hydrogen cyanide reaction, it has been found that the volatilization of the platinum from the gauze is of sufficiently large magnitude to render it necessary to clean the apparatus from time to time in order to recover the deposits and residues of platinum which accumulate at various points in the system. Platinum-rhodium alloys are also impractical because of embrittlement at high temperatures, particularly in the presence of carbonaceous substances. It has also been proposed to deposit platinum and its alloys upon a silica or other refractory carrier, but such methods are disadvantageous because the catalytic metal is lost not only by volatilization but also by spalling. Apparently, the high temperatures to which the catalyst is subjected cause a failure of the bond between the metal and the refractory carrier by reason of recrystallization of the metal.

It has now been discovered that the production of hydrocyanic acid from oxygen, ammonia and a hydrocarbon may be improved by employing a catalyst consisting of crystals of electrolytically deposited rhodium. It has been found that rhodium is less volatile than platinum, so that the loss by volatilization is reduced to approximately one-half of the loss occurring when platinum is employed at the same temperature. Furthermore, the rhodium in electrolytically deposited form is not subject to the recrystallization which is characteristic of platinum and its alloys so that the catalyst is more stable and remains in an extremely active condition producing high yields for long periods of time.

The rhodium is employed in the form of electrolytically deposited crystalline particles or granules. It is found that higher conversions may be obtained by the use of rhodium crystals or granules in random arrangement. Such an arrangement of the particles permits a more effective contact of the gases with the rhodium particles without excessive pressure drop, than can be obtained with a comparable depth of superimposed gauzes. This is a marked improvement over the use of screens or gauzes, such as that described in U. S. 2,478,875, which mentions the use of a large number of superimposed platinum gauzes. Another advantage in the use of rhodium particles resides in its ability to withstand sudden surges of gas which would buckle a gauze, but which is without deleterious effect upon the bed of particles.

The rhodium crystals employed in the process of the present invention may be prepared by conventional methods such as electrochemical deposition from rhodium salts. A coarsely crystalline form of rhodium may be obtained by an electrolytic method in accordance with the procedure of Joly and Leidic, Comptes Rendus, 112, 793 (1891).

The physical size of the crystals of rhodium is not material to the invention, although particles ranging in size from 16 mesh to 100 mesh may conveniently be employed. The hydrogen cyanide reaction may be conducted at temperatures ranging from 950–1250° C. The temperature and pressure under which the reaction is conducted are not critical, although it is found that the use of electrolytically formed rhodium crystals permits higher temperatures to be employed intially and without deleterious effects or low yields. Under the above-described conditions it is found that excellent yields of hydrocyanic acid are obtained and the catalyst has a very good stability in spite of the high operating temperature. The catalyst also remains in an active state without appreciable disintegration over periods of several months, with the volatility loss amounting to only about one-half as much as is observed with platinum at corresponding temperatures.

The following example further illustrates the present invention:

Example

A gas mixture consisting of 12% of ammonia, 10% of methane, 15% of oxygen, 2% of ethane and propane and the remainder of nitrogen is passed through the catalyst consisting of electrolytically deposited crystals of rhodium at a temperature of about 1200° C. and with a contact time of 0.0002 second. The bed of crystals is about one-quarter inch thick and is supported upon a bed of non-reactive material such as alumina. On passing the above reaction mixture through the bed of crystals, it is found that good yields of hydrocyanic acid are obtained. The granular crystalline bed is found to be mechanically stable and free from disintegration such as is encountered in gauze or supported catalysts. Furthermore, the volatilization loss is negligible.

The gas composition employed is not critical in the present invention. The proportions of oxygen, which may be provided as a stream of air, ammonia, and the hydrocarbons may be varied widely. Examples of feed mixtures are shown in U. S. 1,934,838, issued November 14, 1933, although various other ratios may be employed.

What is claimed is:

1. In the production of hydrocyanic acid by passing a gaseous mixture comprising oxygen, ammonia and hydrocarbons over a catalyst at elevated temperatures, the improvement which comprises passing said gaseous mixture over a catalyst consisting of crystals of electrolytically produced rhodium, said catalyst being further characterized by the absence of a carrier.

2. In the production of hydrocyanic acid by passing a gaseous mixture comprising oxygen, ammonia, and hydrocarbons over a catalyst at a temperature in the range of from about 950° C. to about 1250° C., the improvement which comprises passing said gaseous mixture over a catalyst consisting of crystals of electrolytically produced rhodium, said catalyst being further characterized by the absence of a carrier.

3. In the production of hydrocyanic acid by passing a gaseous mixture comprising air, ammonia, and natural gas over a catalyst at elevated temperatures, the improvement which comprises passing said gaseous mixture over a catalyst consisting of crystals of electrolytically produced rhodium, said catalyst being further characterized by the absence of a carrier.

RUDOLPH L. HEIDER.

References Cited in the file of this patent

UNITED STATES PATENTS

| Number | Name | Date |
|---|---|---|
| 1,907,710 | Bass | May 9, 1933 |
| 1,978,198 | Handforth | Oct. 23, 1934 |
| 2,083,824 | Bond et al. | June 15, 1937 |
| 2,267,753 | Ruthardt | Dec. 30, 1941 |
| 2,387,577 | Green | Oct. 23, 1945 |